(12) United States Patent
Park et al.

(10) Patent No.: US 12,457,400 B2
(45) Date of Patent: Oct. 28, 2025

(54) CAMERA MODULE

(71) Applicant: SAMSUNG ELECTRO-MECHANICS CO., LTD., Suwon-si (KR)

(72) Inventors: Chuel Jin Park, Suwon-si (KR); Su Kyeong Kim, Suwon-si (KR); Se Houn Lee, Suwon-si (KR); Soo Yeon Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 298 days.

(21) Appl. No.: 18/109,952

(22) Filed: Feb. 15, 2023

(65) Prior Publication Data

US 2023/0388614 A1 Nov. 30, 2023

(30) Foreign Application Priority Data

May 31, 2022 (KR) .......................... 10-2022-0066781

(51) Int. Cl.
*H04N 23/55* (2023.01)
*G02B 7/10* (2021.01)

(52) U.S. Cl.
CPC .............. *H04N 23/55* (2023.01); *G02B 7/10* (2013.01)

(58) Field of Classification Search
CPC ........ H04N 23/50; H04N 23/51; H04N 23/55; H04N 23/57; G02B 7/02; G02B 7/08; G02B 7/10; G02B 7/04; G02B 7/023; G03B 5/00; G03B 5/04; G03B 13/32; H02K 33/16; H02K 2203/03
See application file for complete search history.

(56) References Cited

U.S. PATENT DOCUMENTS

| | | | |
|---|---|---|---|
| 2008/0170306 A1* | 7/2008 | Shintani | H04N 23/55 396/529 |
| 2011/0001872 A1* | 1/2011 | Honsho | H04N 23/55 359/701 |
| 2011/0188842 A1 | 8/2011 | Masuki | |
| 2016/0341926 A1 | 11/2016 | Byon et al. | |
| 2021/0173223 A1 | 6/2021 | Seo et al. | |
| 2023/0194960 A1* | 6/2023 | Yedid | G03B 30/00 |

FOREIGN PATENT DOCUMENTS

| | | |
|---|---|---|
| CN | 113109918 A | 7/2021 |
| CN | 213690073 U | 7/2021 |
| JP | 5574728 B2 | 8/2014 |
| KR | 10-2015-0108679 A | 9/2015 |
| KR | 10-2272591 B1 | 7/2021 |

OTHER PUBLICATIONS

Korean Office Action issued on May 23, 2024, in counterpart Korean Patent Application No. 10-2022-0066781 (7 pages in English, 6 pages in Korean).

* cited by examiner

*Primary Examiner* — Kelly L Jerabek
(74) *Attorney, Agent, or Firm* — NSIP Law

(57) ABSTRACT

A camera module is provided. The camera module includes a driving unit configured to generate a driving force, a plurality of barrels configured to move in an optical axis direction based on the driving force, and a lens module accommodated in any one barrel among the plurality of barrels. The lens module includes a lens holder fixed to the any one barrel, and a carrier accommodated in the lens holder and configured to move with respect to the lens holder in the optical axis direction. A plurality of ball members disposed between the lens holder and the carrier configured to support a movement of the carrier.

18 Claims, 9 Drawing Sheets

CAMERA MODULE

CROSS-REFERENCE TO RELATED APPLICATIONS

This application claims the benefit under 35 USC § 119(a) of Korean Patent Application No. 10-2022-0066781, filed on May 31, 2022, in the Korean Intellectual Property Office, the entire disclosure of which is incorporated herein by reference for all purposes.

BACKGROUND

1. Field

The following description relates to a camera module.

2. Description of Related Art

Camera modules are implemented in portable electronic devices such as, but not limited to, smartphones, tablet personal computers (PCs), and laptop computers.

In order to capture high-resolution images, the number of lenses that are implemented in an optical system is gradually increasing, and an actuator to perform focus adjustment and/or image stabilization is also provided in such a camera module.

Accordingly, it may be difficult to reduce the size of camera modules without compromising performance improvement. On the other hand, portable electronic devices equipped with camera modules tend to have a lesser thickness.

Accordingly, there is a problem that the camera module is mounted while protruding from the portable electronic device.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a driving unit configured to generate a driving force; a plurality of barrels configured to move in an optical axis direction based on the driving force; and a lens module accommodated in any one barrel among the plurality of barrels, wherein the lens module includes a lens holder fixed to the any one barrel, and a carrier accommodated in the lens holder and configured to move with respect to the lens holder in the optical axis direction, and a plurality of ball members disposed between the lens holder and the carrier, and configured to support a movement of the carrier.

The camera module may further include a first base connected to the driving unit and configured to rotate based on the generated driving force, wherein the plurality of barrels are configured to move in the optical axis direction when the first base rotates, wherein portions of the plurality of barrels are configured to rotate while moving in the direction of the optical axis, and wherein, when the portions of the plurality of barrels rotate, the any one barrel in which the lens module is accommodated is configured to move in the optical axis direction.

The camera module may further include a first base, connected to the driving unit, and configured to rotate based on the generated driving force; and a second base disposed inside the first base, wherein the plurality of barrels may include a first barrel disposed inside the second base and configured to be drawn out from the second base in the optical axis direction; a second barrel disposed inside the first barrel; and a third barrel including the lens module and configured to extend from the second barrel in the optical axis direction.

The first barrel may be configured to rotate and move in the optical axis direction, and when the first barrel moves, the third barrel is configured to move relative to the first barrel in the optical axis direction.

The first base may include a plurality of first guide portions which extend in the optical axis direction, wherein the second base includes a plurality of second guide portions that are inclined with respect to the first guide portion, wherein the first barrel may be provided with a plurality of first protrusions disposed thereon, and wherein the first guide portion and the second guide portion may be disposed to partially overlap, and the first protrusion is disposed on the first guide portion and the second guide portion.

The second barrel may include a plurality of third guide portions which extend in the optical axis direction, wherein the first barrel includes a plurality of fourth guide portions inclined with respect to the third guide portion, wherein the third barrel may be provided with a plurality of second protrusions disposed thereon, and wherein the third guide portion and the fourth guide portion may be disposed to partially overlap, and the second protrusion is disposed on the third guide portion and the fourth guide portion.

The camera module may include a first magnetic body disposed on the lens holder and a second magnetic body r disposed on the carrier; and a coil and a connection substrate disposed in the lens holder and disposed to face the first magnetic body and the second magnetic body.

The plurality of ball members may be disposed in a plurality of ball rolling parts disposed in a form of grooves in the lens holder and the carrier, respectively.

The connection substrate may have a length in the optical axis direction, and comprises a connecting part that is bent at least once in the optical axis direction.

An axis of rotation of the driving unit and an axis of rotation of the first base may be perpendicular, and the plurality of barrels may be configured to move in a direction, perpendicular to the axis of rotation of the driving unit.

A gear may be disposed on a portion of an outer circumferential surface of the first base and is configured to mesh with a gear that is disposed on the driving unit.

In a general aspect, a camera module includes a driving unit configured to generate a driving force; a first base configured to rotate based on the driving force; a plurality of barrels configured to be extended from the first base and retracted into the first base when the first base rotates; and a lens module accommodated in the plurality of barrels, wherein any one barrel among the plurality of barrels is configured to rotate during an extension operation of the camera module and a retraction operation of the camera module, wherein another one barrel among the plurality of barrels is configured to be extended and retracted in the any one barrel when the any one barrel rotates, and wherein the lens module includes a lens barrel that is configured to move with respect to the another one barrel in an optical axis direction.

The camera module may further include a second base disposed within the first base, wherein the plurality of barrels may include a first barrel in which a plurality of guide portions are disposed; a second barrel disposed inside the first barrel and configured to have a plurality of guide holes; and a third barrel in which a plurality of protrusions are disposed, and the guide portion is disposed to be inclined with respect to the guide hole, and the protrusion is disposed in the guide portion and the guide hole.

The lens module may further include a lens holder fixed to the third barrel; a carrier accommodated in the lens holder and coupled to the lens barrel; a first magnetic body disposed on the lens holder and a second magnetic body disposed on the carrier; and a plurality of ball members disposed between the lens holder and the carrier and supporting configured to support a movement of the carrier in the optical axis direction.

The guide hole may be formed in a form of a hole in a direction, parallel to the optical axis, and the guide portion and the guide hole form an acute angle and are disposed to partially overlap.

The plurality of guide portions, the plurality of guide holes, and the plurality of protrusions may be disposed at equal intervals on outer circumferential surfaces of the plurality of barrels.

In a general aspect, a camera module includes a first base; a second base disposed in the first base; a first barrel disposed in the second base; a second barrel disposed in the first barrel; and a third barrel disposed in the second barrel; a lens module accommodated in at least one of the first barrel, the second barrel, and the third barrel; a driver configured to move the lens module in an optical axis direction; wherein the first barrel, the second barrel, and the third barrel are configured to extend in the optical axis direction during an operational state of the camera module, and are configured to retract into the first base and the second base during a non-operational state of the camera module, and wherein the driver comprises ball members disposed between a lens carrier and a lens holder of the lens module, and the ball members are configured to move in the optical axis direction.

The ball members may be configured to support a movement of the lens carrier in the optical axis direction.

Other features and aspects will be apparent from the following detailed description, the drawings, and the claims.

Figure 1:
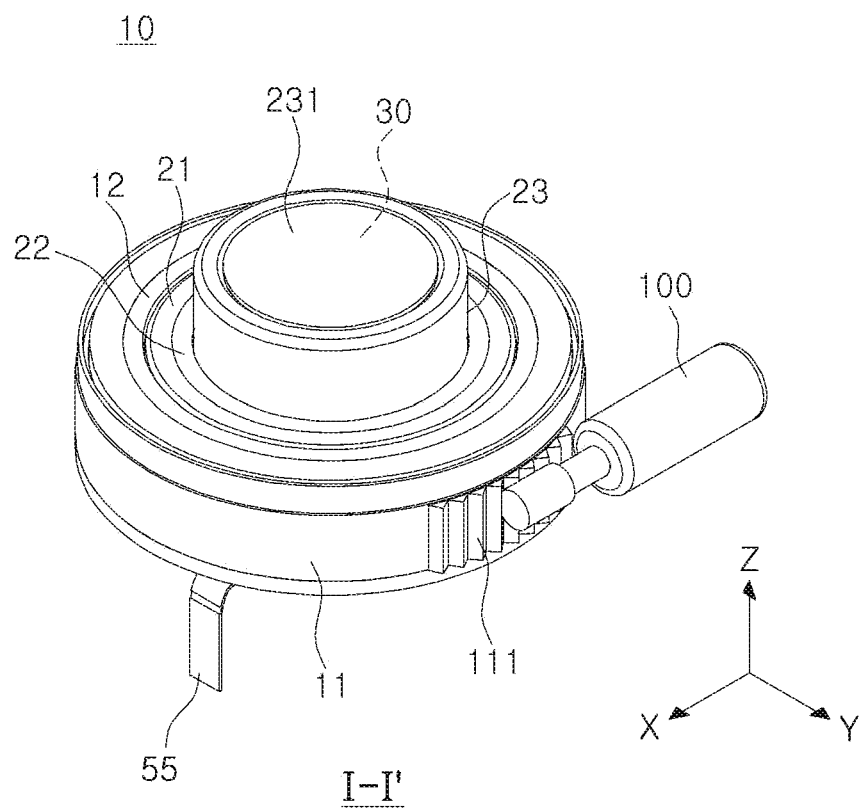
FIG. 1 illustrates a perspective view of an example camera module in a pop-in state, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

As used herein, the term "and/or" includes any one and any combination of any two or more of the associated listed items. The phrases "at least one of A, B, and C", "at least one of A, B, or C', and the like are intended to have disjunctive meanings, and these phrases "at least one of A, B, and C", "at least one of A, B, or C', and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples provide a camera module that adjusts a degree of protrusion of a lens barrel depending on whether or not the camera module is used.

In accordance with one or more embodiments, a camera module 10 is provided, and may be provided in portable electronic devices such as, but not limited to, mobile communication terminals, smartphones, tablet PCs, and the like.

Figure 2:
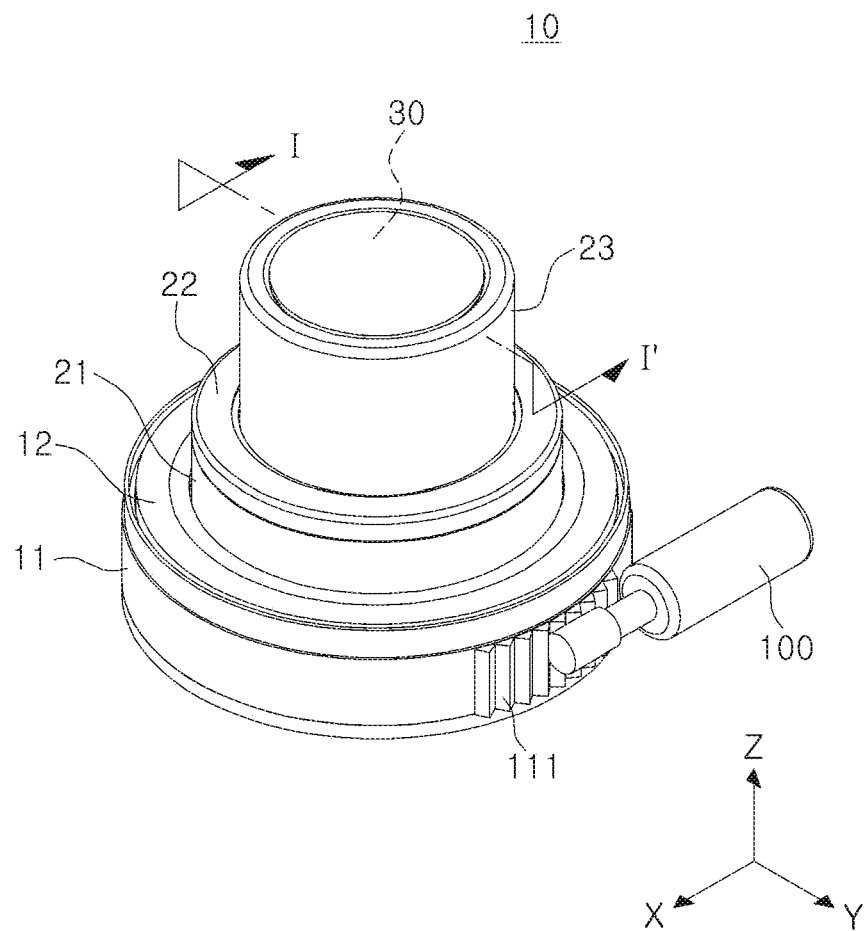
FIG. 2 illustrates a perspective view of an example camera module in a pop-out state, in accordance with one or more embodiments.
Figure 3:
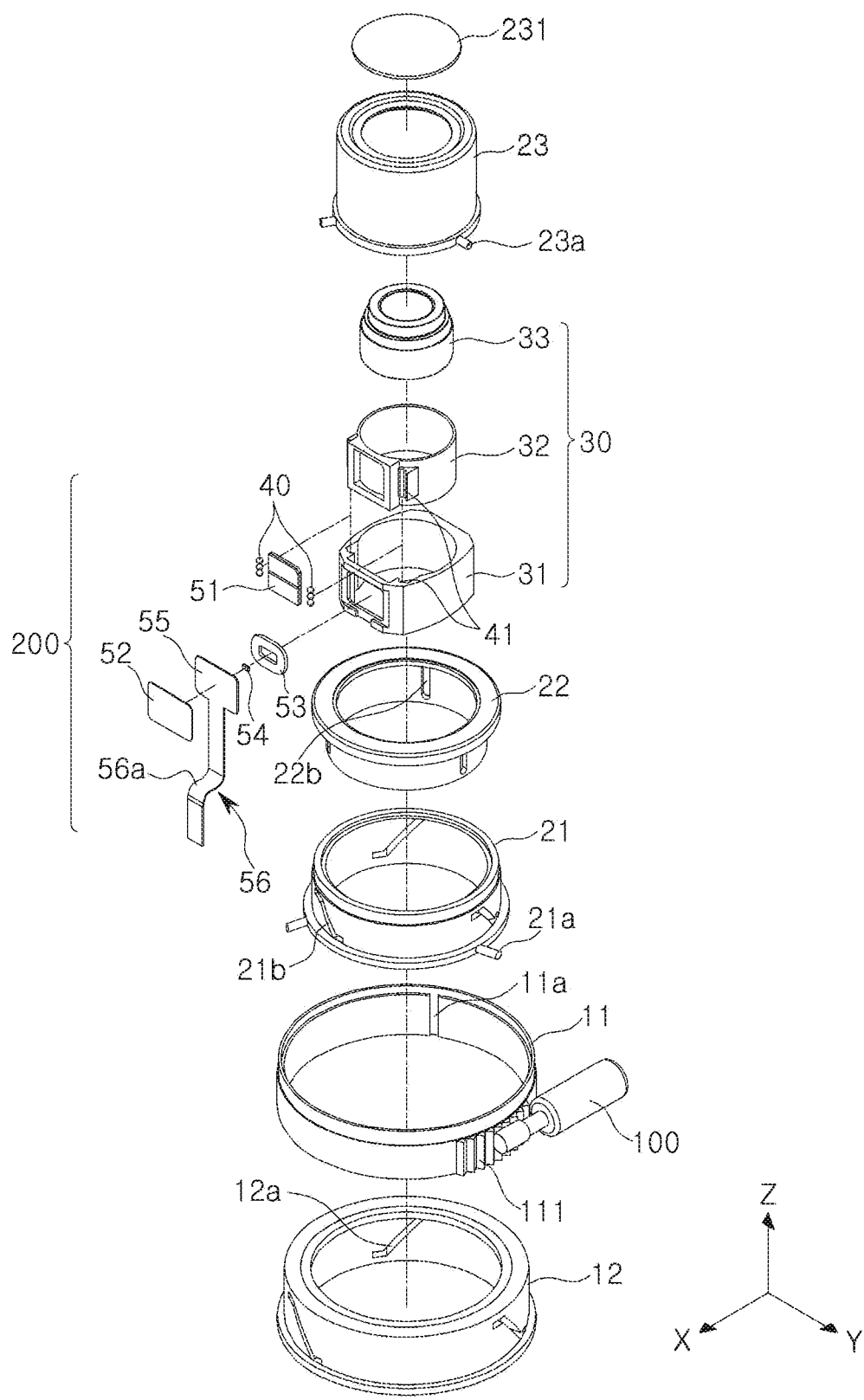
FIG. 3 illustrates a schematic exploded perspective view of an example camera module, in accordance with one or more embodiments.

FIG. 1 illustrates a perspective view of the camera module 10 in a pop-in state, in accordance with one or more embodiments, FIG. 2 illustrates a perspective view of the camera module 10 in a pop-out state, in accordance with one or more embodiments, and FIG. 3 is a schematic exploded perspective view of the camera module 10 in accordance with one or more embodiments. In the one or more examples, a pop-in state may also refer to a drawn-in state or a retraction state, and a pop-out state may also refer to a drawn-out state or an extension state, as only examples.

The height of the camera module 10 in accordance with one or more embodiments, may change depending on whether the camera module is operated or not. A change in height of the camera module 10 according to an example will be described with reference to FIGS. 1 and 2.

Referring to FIG. 1, the camera module 10, in an initial state in which power is not turned on, is in a pop-in state, and a second base 12 and a plurality of barrels 21, 22 and 23 may be disposed inside the first base 11. In the pop-in state, the plurality of barrels 21, 22 and 23 may not move relative to the first base 11 and the second base 12.

Referring to FIG. 2, the camera module 10 is in a pop-out state, and the plurality of barrels 21, 22, and 23 are drawn out of the camera module while moving relative to the first base 11 and the second base 12 in the optical axis (Z-axis) direction. The plurality of barrels 21, 22 and 23 that are drawn out move relatively in the direction of the optical axis (Z-axis), and are retracted into the first base 11 and the second base 12 to return to the pop-in state of FIG. 1. The method in which the plurality of barrels 21, 22, and 23 are drawn out and drawn in while moving relative to the first base 11 and the second base 12 will be described later.

Referring to FIG. 3. the example camera module 10 may include a first driving unit 100, a second driving unit 200, the first base 11, the second base 12, the plurality of barrels 21, 22 and 23, and a lens module 30 accommodated in the plurality of barrels 21, 22, and 23.

The first driving unit 100 provides driving force such that the plurality of barrels 21, 22, and 23 may be drawn out and retracted and moved in the direction of the optical axis (Z-axis). In an example, the first driving unit 100 may be operated by a cylindrical motor. In this example, the rotational axis of the first driving unit 100 may be disposed on the outer circumferential surface of the first base 11, to be perpendicular to the optical axis (Z-axis) and to rotate. A worm may be formed on a shaft that is disposed on a portion of the outer circumferential surface of the first driving unit 100, and engages with a worm gear 111 formed on the outer circumferential surface of the first base 11 when the first driving unit 100 rotates, such that the first base 11 rotates around the optical axis (Z axis). In an example, the first base 11 may be rotated by the rotational movement of the first driving unit 100, to provide a driving force to the plurality of barrels 21, 22, and 23.

For convenience, it is described that the first base 11 rotates about the optical axis (Z-axis), but the rotational axis of the first base 11 may not exactly coincide with the optical axis (Z-axis). For example, the first base 11 may be rotated with an axis parallel to the optical axis (Z-axis) as a rotation axis.

The first base 11 may be disposed on the lowermost end of the camera module 10. The second base 12 may be disposed inside the first base 11. The second base 12 may be mounted inside the first base 11, to have the same height as the height of the first base 11 in the optical axis (Z-axis) direction. The worm gear 111 may be formed on the outer circumferential surface of the first base 11 to be engaged with the worm of the first driving unit 100 described above.

On the inner circumferential surface of the first base 11, a plurality of first guide portions 11a may be formed in the form of grooves extending in the optical axis (Z-axis) direction. In an example, the plurality of first guide portions 11a may be grooves that are perpendicular to the X-Y plane. A plurality of second guide portions 12a may be formed in the side surface of the second base 12. The plurality of second guide portions 12a may be formed to have an inclination with respect to the first guide portion 11a, and may be formed in the form of a hole penetrating through the side surface of the second base 12. For example, the plurality of second guide portions 12a may be in the form of oblique holes forming an acute angle with the first guide portion 11a.

The plurality of barrels 21, 22, and 23 may include a first barrel 21, a second barrel 22, and a third barrel 23. The plurality of barrels 21, 22, and 23 may be cylinders pierced in the optical axis (Z-axis) direction. The first barrel 21 may be disposed inside the second base 12, and the second barrel 22 may be disposed inside the first barrel 21. The third barrel 23 may be disposed inside the second barrel 22 and may have a space that accommodates the lens module 30. For example, the first base 11, the second base 12, the first barrel 21, the second barrel 22, and the third barrel 23 may be formed to decrease in diameter in order, and the length of the third barrel 23 in the optical axis (Z-axis) direction may be the largest to secure a space that accommodates the lens module 30.

The lower end of the second base 12 may include a protruding structure to come into contact with the lower end of the first base 11. For example, when the outer circumferential surface of the second base 12 overlaps the inner circumferential surface of the first base 11, the protruding structure of the lower end of the second base 12 may be disposed below the lower end of the first base 11.

The upper end of the second barrel 22 may include a protruding structure that may come into contact with the upper end of the first barrel 21. For example, when the outer circumferential surface of the second barrel 22 overlaps the inner circumferential surface of the first barrel 21, the upper end of the second barrel 22 may be disposed on the upper end of the first barrel 21.

The third barrel 23 may be disposed inside the second barrel 22, to accommodate the lens module 30. The third barrel 23 may include a detachable cover 231 on an uppermost end to protect the lens module 30.

A plurality of third guide portions 21b may be formed in the form of holes that penetrate through the side surface of the first barrel 21, in the side surface of the first barrel 21. A plurality of fourth guide portions 22b may be formed in the side surface of the second barrel 22 in the form of holes that penetrate through the side surface of the second barrel 22. The fourth guide portion 22b may be formed in the form of a vertical hole, and the third guide portion 21b may be formed to have an inclination with respect to the fourth guide portion 22b. For example, the third guide portion 21b may be in the form of an oblique hole forming an acute angle with the fourth guide portion 22b.

The plurality of first guide portions 11a and second guide portions 12a and third guide portions 21b and fourth guide portions 22b may be disposed to overlap each other. For example, the first guide portion 11a and the second guide portion 12a may be disposed to overlap each other in a direction perpendicular to the optical axis in the pop-in state, and the third guide portion 21b and the fourth guide portion 22b may also be disposed to overlap each other in a direction perpendicular to the optical axis in the pop-in state.

The plurality of guide portions 11a, 12a, 21b, and 22b may be disposed at equal intervals respectively in the first base 11, the second base 12, the first barrel 21, and the second barrel 22. For example, three first guide portions 11a disposed at equal intervals in the first base 11 and three second guide portions 12a disposed at equal intervals in the second base 12 may overlap each other. Three third guide portions 21b disposed at equal intervals in the first barrel 21 and three fourth guide portions 22b disposed at equal intervals in the second barrel 22 may overlap each other.

A plurality of first protrusions 21a may be formed on the lower end of the first barrel 21 in the circumferential direction. The plurality of first protrusions 21a may protrude in a direction intersecting the optical axis (Z-axis). For example, three first protrusions 21a may be disposed at equal intervals on the lower end of the first barrel 21. The plurality of first protrusions 21a pass through the second guide portions 12a in the form of an oblique hole of the second base 12, and simultaneously, may be accommodated in the first guide portions 11a of the first base 11 having the vertical groove shape. For example, in the case of pop-out driving and pop-in driving of the camera module 10, the plurality of first protrusions 21a pass through the oblique holes of the second guide portion 12a, and perform an oblique motion, and simultaneously, are accommodated in the vertical grooves of the first guide portion 11a and perform vertical movement.

A plurality of second protrusions 23a may be formed on the lower end of the third barrel 23 in the circumferential direction. The plurality of second protrusions 23a may protrude in a direction intersecting the optical axis (Z-axis). For example, three second protrusions 23a may be disposed at equal intervals on the lower end of the third barrel 23. The plurality of second protrusions 23a pass through the fourth guide portions 22b of the second barrel 22 in the form of vertical holes, and at the same time, may penetrate through the third guide portions 21b in the form of oblique holes in the first barrel 21. In an example, when performing the pop-out driving operation and the pop-in driving operation of the camera module 10, the plurality of second protrusions 23a may penetrate the vertical holes of the fourth guide portions 22b and may move vertically, and simultaneously, pass through the oblique holes of the third guide portions 21b and perform an oblique motion.

The shapes of the first base 11, the second base 12, the plurality of barrels 21, 22, and 23 and the plurality of guide portions 11a, 12a, 21b, and 22b are not limited to the above description, and any shape that draws out and retracts in the direction of the optical axis (Z-axis) may be implemented.

The lens module 30 includes a lens holder 31 that is fixed inside the third barrel 23, a carrier 32 that moves in an optical axis (Z-axis) direction, and a lens barrel 33 that is accommodated in the carrier 32. The carrier 32 may move relative to the lens holder 31 in the direction of the optical axis (Z-axis), and may perform a focus adjustment operation. A plurality of lenses that capture an image of a subject may be accommodated in the lens barrel 33, and the plurality of lenses may be mounted in the lens barrel 33 along the optical axis (Z-axis).

The second driver 200 provides a driving force to allow the carrier 32, accommodating the lens barrel 33, to move in the direction of the optical axis (Z-axis). In an example, the second driving unit 200 may include a first magnetic body 51 disposed on the carrier 32, a coil 53 disposed to face the first magnetic body 51, a main board 55 on which the coil 53 is mounted, and a position sensor 54. A detailed description of the operation method of the second driving unit 200 will be discussed later.

The lens holder 31 and the carrier 32 may be supported by a magnetic force of the first magnetic body 51 which is mounted on the carrier 32 and a second magnetic body 52 which is mounted on the lens holder 31. In an example, the first magnetic body 51 including at least one magnet may be mounted on one surface of the carrier 32, and the second magnetic body 52 including at least one yoke may be mounted on one surface of the lens holder 31.

Between the lens holder 31 and the carrier 32, a plurality of ball members 40 that support movement of the carrier 32 in the optical axis (Z-axis) direction are disposed. The lens holder 31 and the carrier 32 may respectively have a plurality of ball rolling parts 41 which accommodate the plurality of ball members 40.

Figure 4:
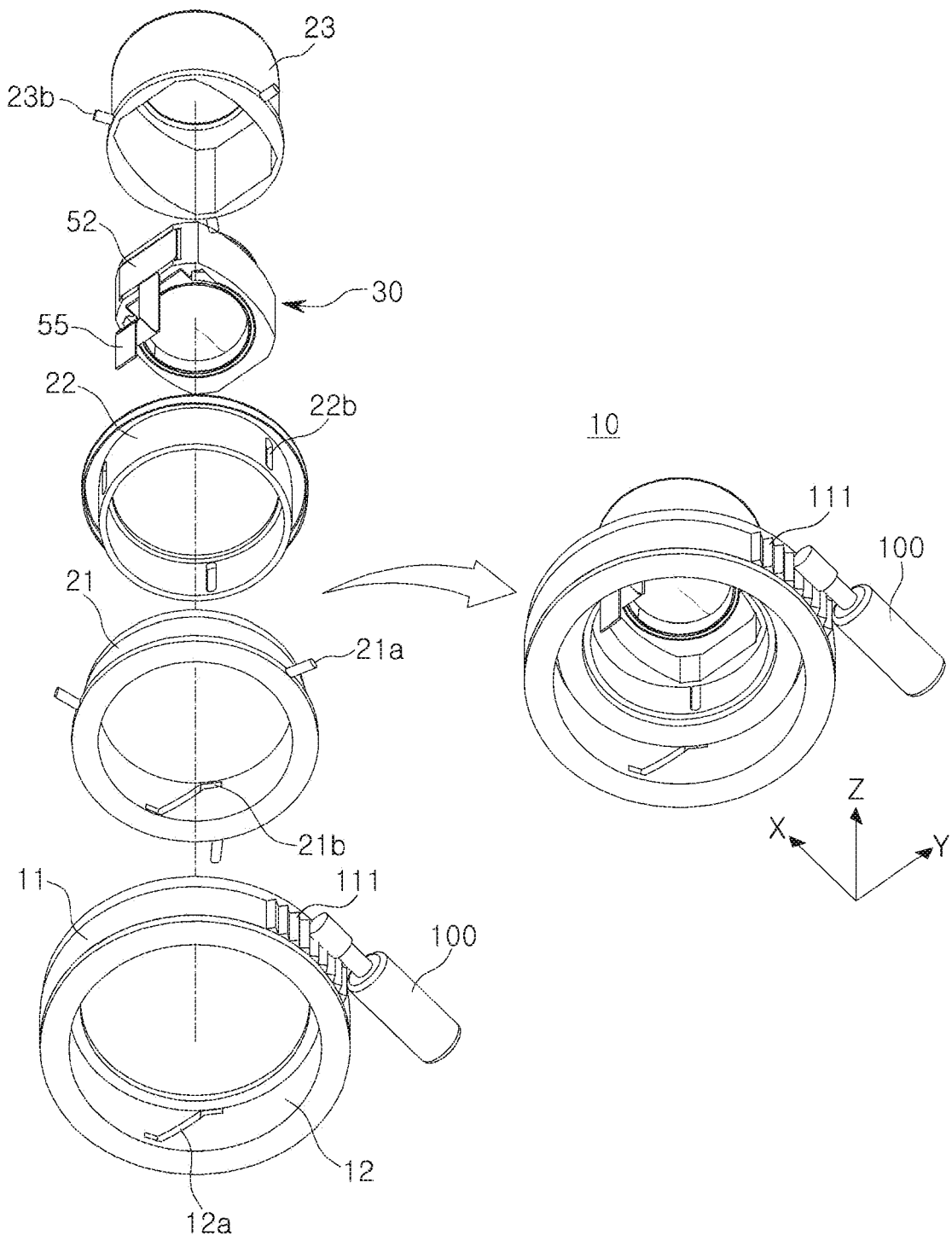
FIG. 4 illustrates a schematic exploded perspective view and an enlarged perspective view illustrating the inside of an example camera module, in accordance with one or more embodiments.
Figure 5:
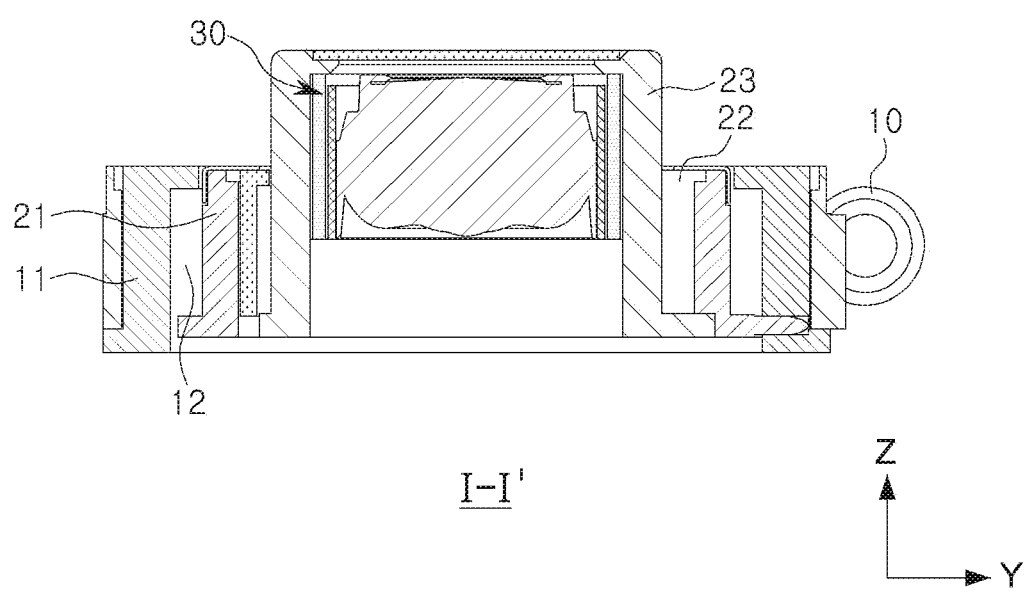
FIG. 5 illustrates a Y-Z cross-sectional view of the example camera module of FIG. 1 cut in the direction I-I'.
Figure 6:
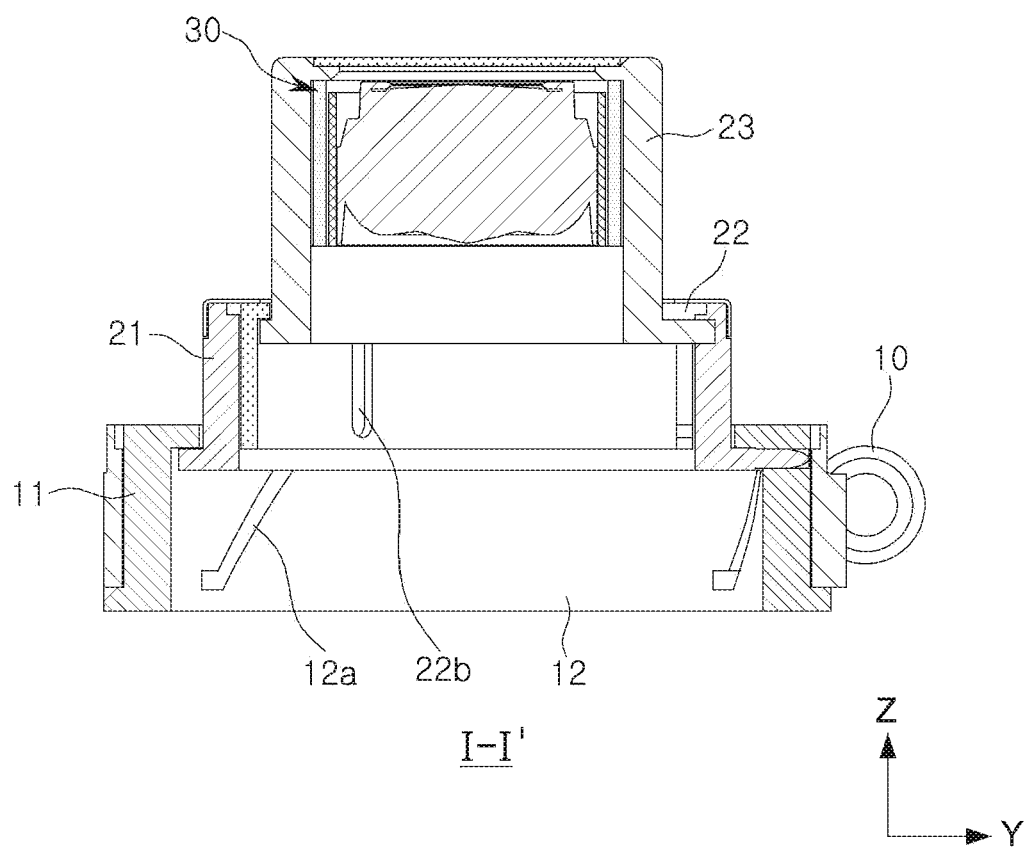
FIG. 6 illustrates a Y-Z cross-sectional view of the example camera module of FIG. 2 cut in the direction I-I'.

FIG. 4 is a schematic exploded perspective view and an enlarged perspective view illustrating the inside of the camera module 10, in accordance with one or more embodiments, FIG. 5 is a Y-Z cross-sectional view of the camera module 10 of FIG. 1 cut in the direction I-I', and FIG. 6 is a Y-Z cross-sectional view of the camera module 10 of FIG. 2 cut in the direction I-I'.

Hereinafter, with reference to FIGS. 4 to 6, a method in which the plurality of barrels 21, 22, and 23 of the camera module 10, in accordance with one or more embodiments, are drawn out and retracted (pop-out and pop-in driving methods) will be described.

The first base 11 rotates around the optical axis (Z-axis) based on the first driving unit 100. Specifically, when the worm that is formed on the first driving unit 100 and the worm gear 111 disposed on the outer circumferential surface of the first base 11 mesh with each other based on the rotation of the first driving unit 100, the first base 11 rotates around the optical axis (Z-axis). (Since FIG. 4 illustrates a state in which the second base 12 is mounted inside the first base 11, the plurality of first guide portions 11a disposed in the inner circumferential surface of the first base 11 are not illustrated.)

When the first base 11 rotates, the second base 21 does not rotate, and moves the first barrel 21 by connecting the oblique movement and the vertical movement of the first protrusion 21a. The first barrel 21 vertically moves in the direction of the optical axis (Z-axis) with respect to the first base 11 and the second base 12 (disposed inside the first base 11), and simultaneously obliquely moves around the optical axis (Z-axis).

Specifically, the first guide portion 11a disposed on the first base 11 according to an example is in the form of a vertical groove, and the second guide portion 21a disposed on the second base 21 is in the form of a diagonal hole. In this example, the first protrusion 21a moves obliquely along the oblique hole of the second guide portion 21a, and vertically moves in the optical axis (Z-axis) direction along the vertical groove of the first guide portion 11a overlapped with the second guide portion 21a. In an example, based on the vertical movement of the first protrusion 21a, the first barrel 21 moves relative to the first base 11 and the second base 12 in the direction of the optical axis (Z-axis), and the first barrel 21 rotates around the optical axis (Z-axis) based on the oblique movement of the first protrusion 21a.

When the first barrel 21 rotates around the optical axis (Z-axis), similar to the first base 11 and the second base 12 described above, the second barrel 22 does not rotate, and moves the third barrel 23 by connecting the oblique motion and the vertical motion of the second protrusion 23a. The third barrel 23 moves vertically in the direction of the optical axis (Z-axis) with respect to the first barrel 21 and the second barrel 22 (disposed inside the first barrel 21), and at the same time, moves obliquely around the optical axis (Z-axis).

Specifically, the third guide portion 21b disposed in the first barrel 21 according to an example may be in the form of an oblique hole, and the fourth guide portion 22b disposed in the second barrel 22 may be in the form of a vertical hole. In this example, the second protrusion 23a moves obliquely along the oblique hole of the third guide portion 21b, and moves vertically in the optical axis (Z-axis) direction along the vertical hole of the fourth guide portion 22b overlapped with the third guide portion 21b. For example, the third barrel 23 rotates around the optical axis (Z-axis) based on the oblique movement of the second protrusion 23a, and the third barrel 23 moves relative to the first barrel 21 and the second barrel 22 in the optical axis (Z-axis) direction based on the vertical movement of the second protrusion 23a.

In summary, in the camera module 10 in the pop-in state of FIG. 5, the second base 12 may be disposed inside the first base 11, the first barrel 21 may be disposed inside the second base 12, the second barrel 22 may be disposed inside the first barrel 21, and the third barrel 30 may be disposed inside the second barrel 22. In this example, the first base 11, the second base 12, the first barrel 21, and the second barrel 22 may have the same height in the optical axis (Z-axis) direction, and the third barrel 23 that accommodates the lens module 30 may be formed higher in the optical axis (Z-axis) direction.

In the example camera module 10, the first base 11, the first barrel 21, and the third barrel 23 are drawn out during a pop-out operation (see FIG. 6). When the camera module 10 is not operating, the camera module 10 is mounted on an electronic device (cell phone or the like) in the pop-in state of FIG. 5, and during operation, the camera module 10 may protrude out of the electronic device in the pop-out state of FIG. 6.

On the other hand, to perform an Auto-Focusing (AF) operation, the camera module 10 should secure a distance for the lens to move in the direction of the optical axis (Z-axis), which causes the thickness of the camera module 10 to increase.

In the camera module 10, in accordance with one or more embodiments, the height of the lens module 30 is variable. For example, when the camera module 10 is not operating, the height of the lens module 30 is lowered and mounted in the product, and when the camera module 10 is operating, the height of the lens module 30 is increased through a pop-out driving method. For example, when the camera module 10 is operated, the third barrel 23 that accommodates the lens module 30 is drawn out by the first driving unit 100, and when not operating, a portion of the third barrel 23 is retracted (See FIG. 1). Therefore, the movement distance of the lens to perform AF driving is secured through the height of the third barrel 23 in the optical axis (Z-axis) direction, and by retracting a portion of the third barrel 23, the camera module 10 may be prevented from protruding (from being popped out) excessively outwardly from the electronic device. In an example, referring to FIG. 1, in the camera module 10 in accordance with one or more embodiments, the thickness of the camera module 10 may be reduced based on the height of the first base 11 in the optical axis (Z-axis) direction.

Figure 7:
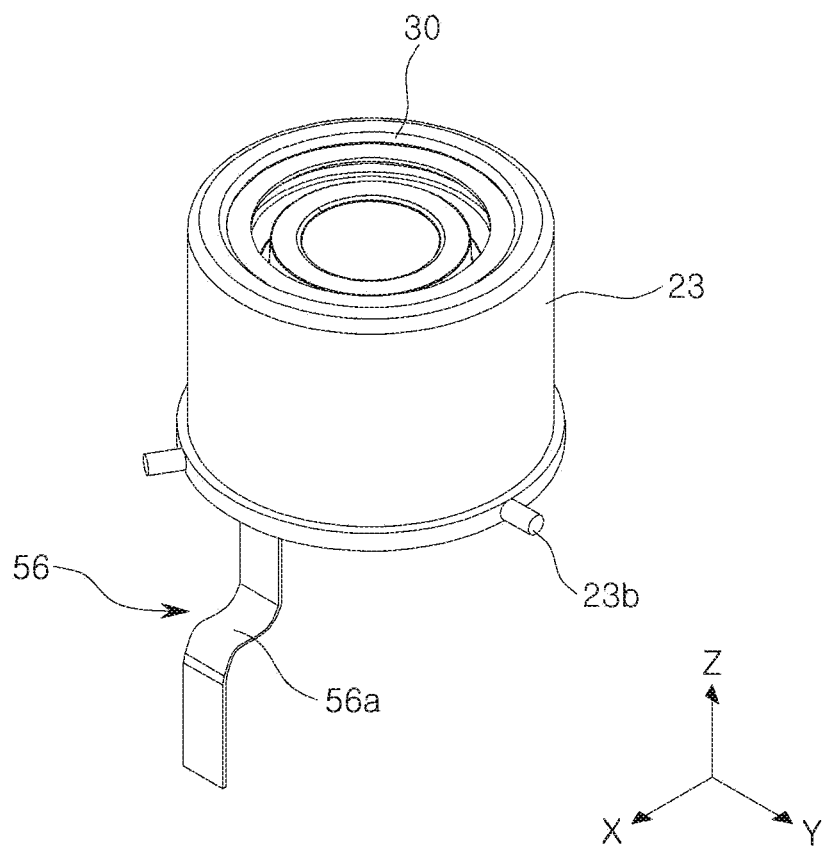
FIG. 7 illustrates an external perspective view of a third barrel in which a lens module and a second driving unit are accommodated, in accordance with one or more embodiments.
Figure 8:
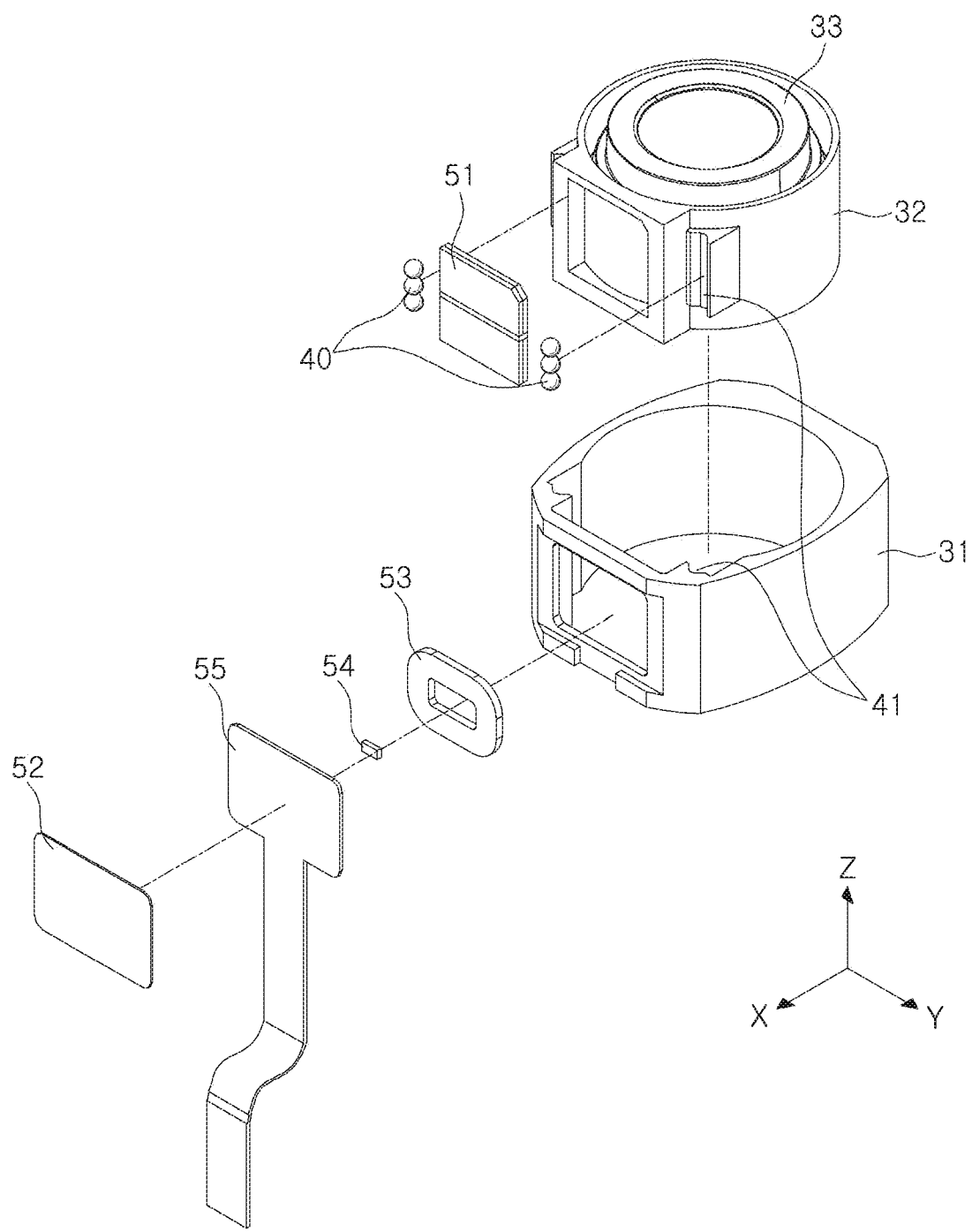
FIG. 8 illustrates an exploded perspective view of a lens module and a second driving unit, in accordance with one or more embodiments.
Figure 9:
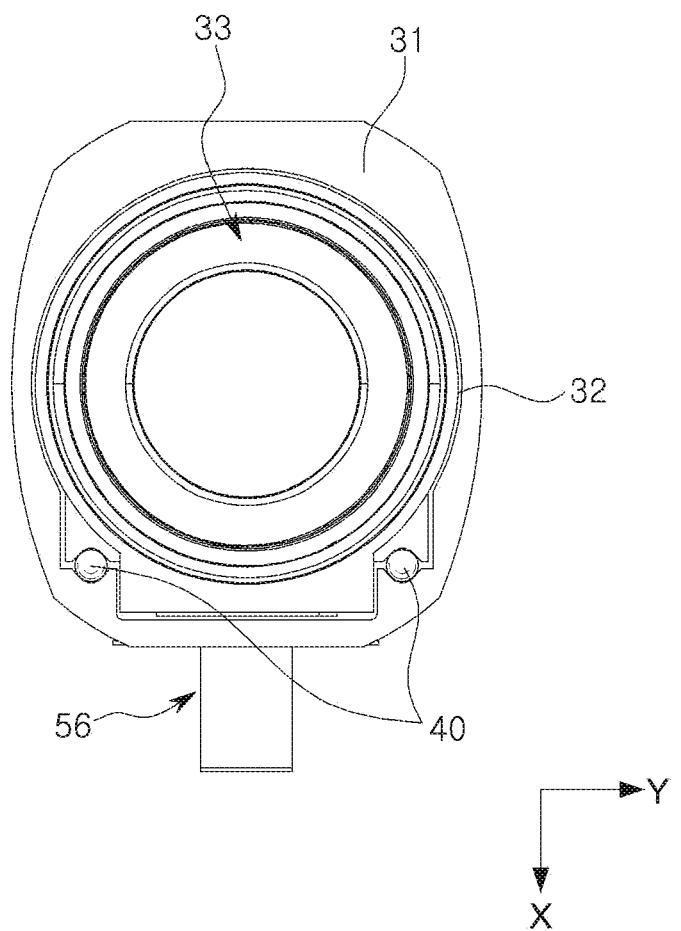
FIG. 9 illustrates a plan view of a third barrel accommodating a lens module and a second driving unit, in accordance with one or more embodiments.

FIG. 7 is an external perspective view of the third barrel 23 in which the lens module 30 and the second driving unit 200 are accommodated, FIG. 8 is an exploded perspective view of the lens module 30 and the second driving unit 200, and FIG. 9 is a plan view of the third barrel 23 that accommodates the lens module 30 and the second driving unit 200.

Hereinafter, the second driving unit 200 according to an example will be described with reference to FIGS. 7 to 9.

The second driving unit 200 drives the lens module 30 to implement auto-focus (AF) and zoom operations, and the like. For example, the second driving unit 200 adjusts the distance between the lens module 30 and the image sensor (not illustrated) by moving the lens barrel 33 coupled with the carrier 32 in the direction of the optical axis (Z-axis).

The coil 53 is mounted on a connecting substrate 55, and the connecting substrate 55 may be fixedly disposed in the third barrel 23 together with the lens holder 31. When power is applied to the coil 53, the carrier 32 on which the first magnetic body 51 is mounted may be moved in the direction of the optical axis (Z-axis) based on the electromagnetic force between the first magnetic body 51 and the coil 53.

The connecting substrate 55 may include an extension portion 56 of which the length extends in the direction of the optical axis (Z-axis). Since the camera module 10 according to an example may have a structure in which the plurality of barrels 21, 22, and 23 are drawn out and retracted in the direction of the optical axis (Z-axis), the connecting substrate 55 also moves together according to the movement of the third barrel 23. Therefore, the connecting substrate 55 may include the extension portion 56 formed in a form extending in the direction of the optical axis (Z-axis) and may be longer than the height in the direction of the optical axis (Z-axis) at which the lens module 30 in a pop-out state is located. Referring to FIGS. 7 to 8, the extension portion 56 may include a connecting part 56a that may be bent one or more times in the optical axis (Z-axis) direction. For example, the connecting part 56a may have a structure that is bent on the first base 11 of the camera module 10 in a pop-in state.

When the second driving unit 200 moves in the direction of the optical axis (Z-axis), the plurality of ball members 40 are disposed between the carrier 32 and the lens holder 31. The plurality of ball members 40 according to an example may be disposed three by one in each of the plurality of ball rolling parts 41, but the examples are not limited thereto.

The plurality of ball members 40 roll in the direction of the optical axis (Z-axis) based on the driving force generated from the second driving unit 200. Accordingly, the plurality of ball members 40 guide the movement of the carrier 32 in the optical axis (Z-axis) direction. Additionally, the plurality of ball members 40 may be accommodated in the plurality of ball rolling parts 41, and may maintain the distance between the lens holder 31 and the carrier 32.

As set forth above, the camera module according to an example may adjust the protruding amount of the lens barrel depending on whether the camera module is operational.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a driving unit configured to generate a driving force;
   a plurality of barrels configured to move in an optical axis direction based on the driving force; and
   a lens module accommodated in any one barrel among the plurality of barrels,
   wherein the lens module comprises:
   a lens holder fixed to the any one barrel, and
   a carrier accommodated in the lens holder and configured to move with respect to the lens holder in the optical axis direction, and
   a plurality of ball members disposed between the lens holder and the carrier, and configured to support a movement of the carrier.

2. The camera module of claim 1, further comprising a first base connected to the driving unit and configured to rotate based on the generated driving force,
   wherein the plurality of barrels are configured to move in the optical axis direction when the first base rotates,
   wherein portions of the plurality of barrels are configured to rotate while moving in the direction of the optical axis, and
   wherein, when the portions of the plurality of barrels rotate, the any one barrel in which the lens module is accommodated is configured to move in the optical axis direction.

3. The camera module of claim 2, wherein the camera module comprises a first magnetic body disposed on the lens holder and a second magnetic body disposed on the carrier; and
   a coil and a connection substrate disposed in the lens holder and disposed to face the first magnetic body and the second magnetic body.

4. The camera module of claim 3, wherein the plurality of ball members are disposed in a plurality of ball rolling parts disposed in a form of grooves in the lens holder and the carrier, respectively.

5. The camera module of claim 3, wherein the connection substrate has a length in the optical axis direction, and comprises a connecting part that is bent at least once in the optical axis direction.

6. The camera module of claim 2, wherein an axis of rotation of the driving unit and an axis of rotation of the first base are perpendicular, and
   the plurality of barrels are configured to move in a direction, perpendicular to the axis of rotation of the driving unit.

7. The camera module of claim 6, wherein a gear is disposed on a portion of an outer circumferential surface of the first base and is configured to mesh with a gear that is disposed on the driving unit.

8. The camera module of claim 1, further comprising:
   a first base, connected to the driving unit, and configured to rotate based on the generated driving force; and
   a second base disposed inside the first base,
   wherein the plurality of barrels comprise:
   a first barrel disposed inside the second base and configured to be drawn out from the second base in the optical axis direction;
   a second barrel disposed inside the first barrel; and
   a third barrel including the lens module and configured to extend from the second barrel in the optical axis direction.

9. The camera module of claim 8, wherein the first barrel is configured to rotate and move in the optical axis direction, and when the first barrel moves, the third barrel is configured to move relative to the first barrel in the optical axis direction.

10. The camera module of claim 9, wherein the first base comprises a plurality of first guide portions which extend in the optical axis direction,
    wherein the second base comprises a plurality of second guide portions that are inclined with respect to the first guide portion, wherein the first barrel is provided with a plurality of first protrusions disposed thereon, and wherein the first guide portion and the second guide portion are disposed to partially overlap, and the first protrusion is disposed on the first guide portion and the second guide portion.

11. The camera module of claim 9, wherein the second barrel comprises a plurality of third guide portions which extend in the optical axis direction, wherein the first barrel comprises a plurality of fourth guide portions inclined with respect to the third guide portion, wherein the third barrel is provided with a plurality of second protrusions disposed thereon, and wherein the third guide portion and the fourth guide portion are disposed to partially overlap, and the second protrusion is disposed on the third guide portion and the fourth guide portion.

12. A camera module, comprising:

a driving unit configured to generate a driving force;

a first base configured to rotate based on the driving force;

a plurality of barrels configured to be extended from the first base and retracted into the first base when the first base rotates; and a lens module accommodated in the plurality of barrels, wherein any one barrel among the plurality of barrels is configured to rotate during an extension operation of the camera module and a retraction operation of the camera module, wherein another one barrel among the plurality of barrels is configured to be extended and retracted in the any one barrel when the any one barrel rotates, and wherein the lens module comprises a lens barrel that is configured to move with respect to the another one barrel in an optical axis direction.

13. The camera module of claim 12, further comprising a second base disposed within the first base, wherein the plurality of barrels comprise:

a first barrel in which a plurality of guide portions are disposed;

a second barrel disposed inside the first barrel and configured to have a plurality of guide holes; and a third barrel in which a plurality of protrusions are disposed, and the guide portion is disposed to be inclined with respect to the guide hole, and the protrusion is disposed in the guide portion and the guide hole.

14. The camera module of claim 13, wherein the lens module comprises:

a lens holder fixed to the third barrel;

a carrier accommodated in the lens holder and coupled to the lens barrel;

a first magnetic body disposed on the lens holder and a second magnetic body disposed on the carrier; and a plurality of ball members disposed between the lens holder and the carrier and supporting configured to support a movement of the carrier in the optical axis direction.

15. The camera module of claim 13, wherein the guide hole is formed in a form of a hole in a direction, parallel to the optical axis, and the guide portion and the guide hole form an acute angle and are disposed to partially overlap.

16. The camera module of claim 13, wherein the plurality of guide portions, the plurality of guide holes, and the plurality of protrusions are disposed at equal intervals on outer circumferential surfaces of the plurality of barrels.

17. A camera module, comprising:

a first base;

a second base disposed in the first base;

a first barrel disposed in the second base;

a second barrel disposed in the first barrel; and a third barrel disposed in the second barrel;

a lens module accommodated in at least one of the first barrel, the second barrel, and the third barrel;

a driver configured to move the lens module in an optical axis direction;

wherein the first barrel, the second barrel, and the third barrel are configured to extend in the optical axis direction during an operational state of the camera module, and are configured to retract into the first base and the second base during a non-operational state of the camera module, and wherein the driver comprises ball members disposed between a lens carrier and a lens holder of the lens module, and the ball members are configured to move in the optical axis direction.

18. The camera module of claim 17, wherein the ball members are configured to support a movement of the lens carrier in the optical axis direction.

* * * * *